W. B. Dodson,
Truss,
N° 1,641.  Patented June 17, 1840.
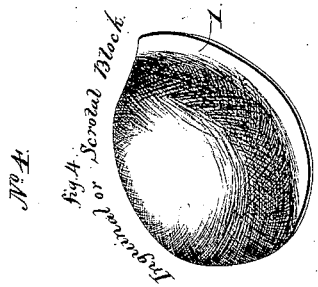
N° 4. Fig. 4 Scrotal Block.
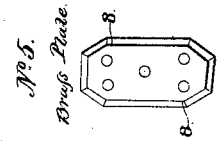
N° 5. Brass Plate.
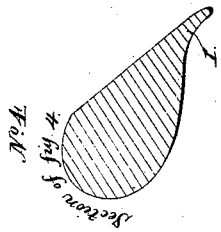
N° 4. Section of fig. 4.
N° 2. Fig. 3 Femoral Block.
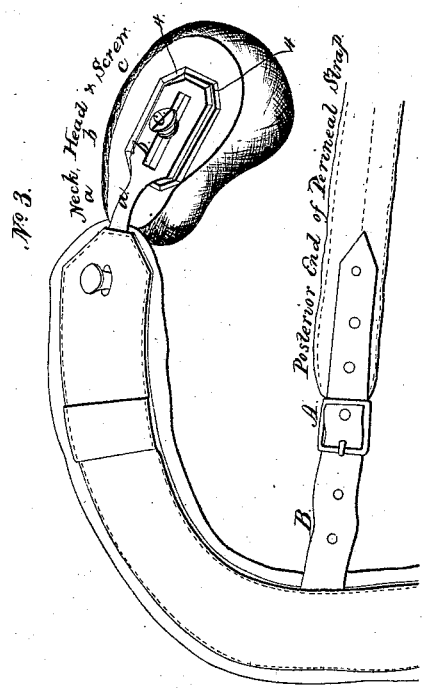
N° 3. Neck, Head & Screw. Posterior End of Perineal Strap. Anterior Extremity of Perineal Strap.
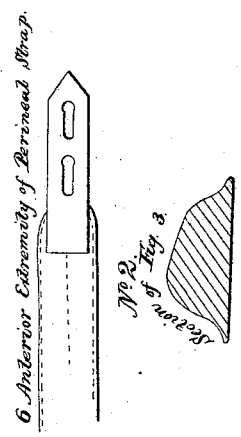
N° 2. Section of Fig. 3.
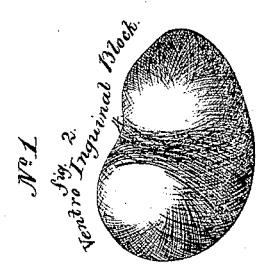
N° 1. Fig. 2 Ventro Inguinal Block.
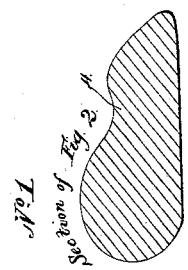
N° 1. Section of Fig. 2.

W. B. Dodson,
Truss,
N° 1,641.
Patented June 17, 1840.
Sheet 2-4 Sheets.
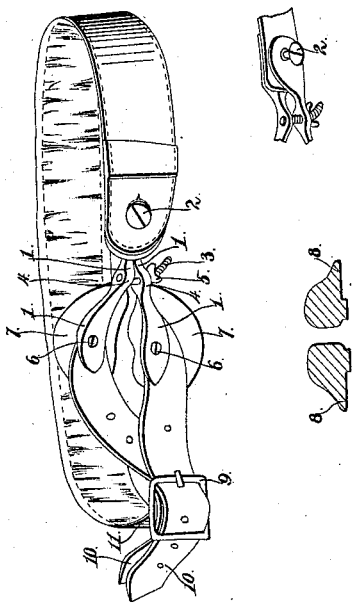

W. B. Dodson,
Truss;
N° 1,641.
Patented June 17, 1840.
Sheet 3-4 Sheets.
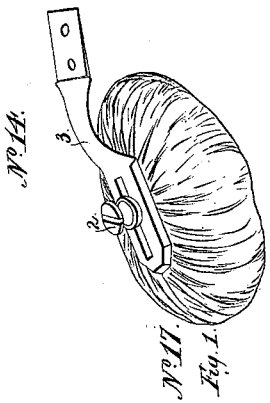
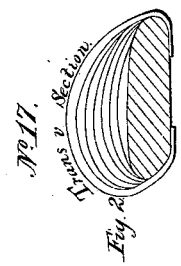
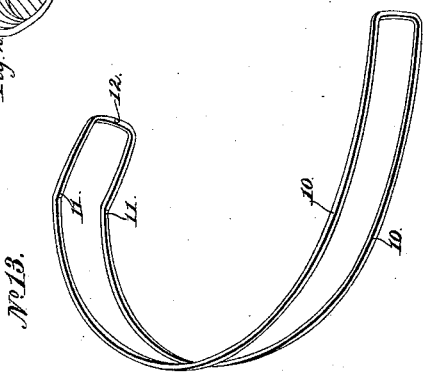
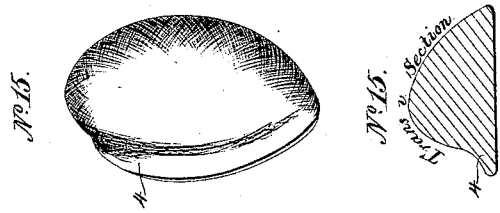
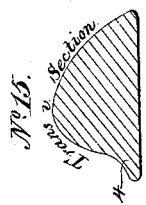
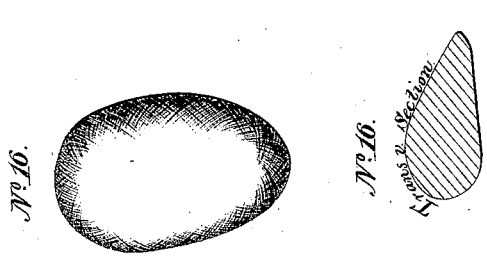
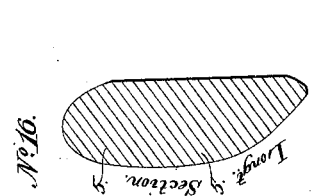

W. B. Dodson,
Truss,
N° 1,641.
Patented June 17, 1840.
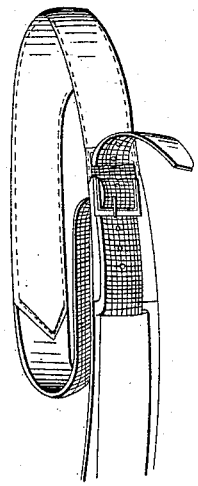
N° 19.
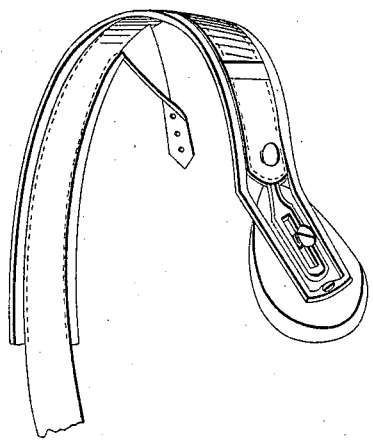
N° 18.

UNITED STATES PATENT OFFICE.

W. B. DODSON, OF LOUISVILLE, KENTUCKY.

IMPROVEMENT IN SURGEON'S TRUSSES.

Specification forming part of Letters Patent No. 1,641, dated June 17, 1840.

*To all whom it may concern:*

Be it known that I, W. B. DODSON, of the city of Louisville and State of Kentucky, have invented, constructed, made, improved, and applied to their intended purpose new and useful instruments, Improvements on the Truss with Appendages, and have discovered the method of applying the same in the cure of several species of hernia, to which mankind is liable.

The following is a full and correct description of the said instruments, with the manner of applying the same as invented and improved by me.

The inguinal or scrotal block, as shown by Figure 4 in the accompanying Drawing No. 4, may be said to be semi-oviform, with the convex surface or portion pressed a little to one side of a central longitudinal line, the most prominent part being nearer the anterior end of the block than the center. On the upper and thin edge of the block is a rim or flange, Fig. 1, about three-eighths of an inch in width, more or less, as the case may require, (sometimes chamfered a little on its outer edge,) extending about half the circumference of the block, increasing to considerable extent its surface, thereby giving greater ease and comfort to the patient than any other form. It enables him to use a spring of a sufficiently retentive power, when the ring is large and the parts lax, to prevent that protrusion of the hernia which would be liable to take place with the use of a spring wanting in strength with a block of the ordinary shape. The rim is also designed to prevent the block from pressing or sinking so deeply into the ring as to be productive of pain and inconvenience to the patient, which must necessarily follow when the ordinary block is used with a spring sufficiently strong to prevent the above-named protrusion. The re-entro-inguinal block, Drawing No. 1, is in shape very much like the body of the former, a little more elongated and prominent at its anterior portion, with a depression or excavation on the inner surface and lower edge of the block, Fig. 4, to admit the spermatic vessels without inconvenience when on the iliac side of the ring or outer side of the hernia.

The femoral block, as shown in Fig. 3, Drawing No. 2, is somewhat of an elongated semi-ovoid shape, with the pubic or upper end a little thicker or more prominent than the lower end, with a continuous rim or flange a little wider on the outer side, upper and lower ends, than it is on the inner side, forming a part of the outer surface or face of the block. The object of the rim or flange is, first, to increase the inner surface of the block, it being necessary that the entire bulk should be small, owing to the anatomy of the part to which it is applied; second, by preventing the inner or prominent part of the block from sinking too deep, which would be liable to injure the femoral vessels when the force of a very strong spring is required to prevent a protrusion of the hernia; third, more equable pressure is maintained, and it is less liable to produce excoriation than any other form of block with which I am acquainted; fourth, the block is retained in its situation or position with less difficulty than other forms.

The specific dimensions or admeasurements of the block cannot be given, as the indications vary and require to be met by the skill of the surgeon. They are, for instance, the presence or absence of adipose substance about the pubic region, the size of the ring, the irritability of the patient, the force with which the hernia protrudes, &c.

In Drawing No. 3 the neck and head of the spring, figure or letter *a b*, consist of a single piece of soft iron about three inches long. The posterior end, which is attached to the anterior end of a steel spring, is flattened to the width of the spring. Immediately from the end of the latter it is contracted into nearly a round body or wire shape about five-eighths or three-fourths of an inch in length and about two lines thick, slightly curved downward and inward. From the neck it expands abruptly to about five-eighths of an inch in width, one inch and three-eighths in length, and one and a half lines in thickness, which must be equable. The edge is beveled, which makes the inner or posterior surface wider and longer than the anterior or outer surface, the two anterior corners being cut off at an angle of about one hundred and thirty-five degrees, as shown in the drawing Fig. 4. Longitudinally through the center of the above-described head is a fenestra window opening or narrow space seven-eighths of an inch, more or less, in length, and two lines wide, through the center of which a screw with a knob-head (hereinafter to be described) passes and fastens into a brass plate, also to be described. The use of the above-named opening or narrow space is to admit of lengthening or shortening the instrument by sliding the block forward and downward or backward and upward.

The brass plate shown in Drawing No. 5 is a little less than one-eighth of an inch thick, made to correspond to the shape of the head of the spring, being a little longer and wider than the latter, with four screw-holes—one near each corner—through which screws enter to secure the plate to the block, two screws only being used at the same time. By this arrangement and disposition of the screws diagonally—one in the anterior and upper hole, the other in the posterior and lower hole—the plate can be moved the smallest distance desired and firmly fixed as before, whereas, with two screw-holes only, and they in a central line of the plate, this result could not be obtained. Moreover, in the latter case where they both strike the same grain or growth of the wood splitting of the block is a common result.

The knob-headed screw before named, as shown in Drawing No. 3, figure or letter C, consists of a head, neck, shoulder, and screw. The head is about one-fourth of an inch broad, with a slit the same as a common screw and for the same purpose. The shoulder is a little smaller than the head. The screw part is about one-fourth of an inch in length and as thick as the open space in the head of the spring is wide, so as to admit of no lateral motion. The knob-headed screw answers a double or triple purpose: first, to secure the head of the spring firmly to the brass plate; secondly, as a fastening for the anterior end of the perineal strap, being at the most favorable point for that purpose; thirdly, by loosening the screw the block may be turned upon it as a center and secured in the most favorable position without removing it from the patient. Further, the extent of mobility in elongating or shortening the instrument, which is very desirable, is considerably increased by means of a single screw.

Drawing No. 16 is an inguinal block adapted particularly to recent cases of inguinal hernia, where the internal and external rings have not approximated each other. The above-named block on its upper and inner surface is of an elongated semi-oviform shape, terminating at its lower and inner edge abruptly and nearly in a straight line for the space of about one and three-fourths inches to within a short distance of the posterior end, where it falls off to an obtuse point. The inner and inferior surface and most elevated or prominent part of the block would, if turned with the inner face upward, appear to be pressed over to one side, so as to overhang the inferior and outer edge of the block. It differs from the ventral block in being rather narrower and nearly of an equal thickness about an inch and three-fourths of its length, as shown in drawing Fig. 5, a sufficient space to admit of equal compression on the external ring, inguinal canal, or space between the two rings and internal ring. In a natural condition of the parts the space between the rings is about an inch and a half in length.

The second form of block for ventral, or "direct hernia," as it is called, (shown in Drawing No. 15,) resembles the inguinal block last described, with this difference: On the inferior or outer edge is a rim or flange, Fig. 4, about three-eighths of an inch wide extending a little more than one-third of its circumference, forming on that side a sulcus or long and nearly triangular space. In consequence of the rim it has not so much the appearance of being compressed to one side from the center as the former, but throws the most elevated part of the block longitudinally, nearly equidistant between the two extreme edges. It also differs from the former in not maintaining an equal thickness to the same extent. It gradually diminishes from its anterior greatest prominence to the posterior end, it not being necessary in a case indicating the use of this block to make compression on the internal ring. In this species of ventral hernia, making its exit from behind and over Poupart's ligament, as if it had made an attempt to escape through the femoral ring, much difficulty will be experienced in preventing a protrusion with the other forms of block, which are liable to ride down over the ligament if the perineal strap is drawn tight, producing excoriation and soreness. On the other hand, if the perineal strap remains loose in particular attitudes of the body, the instrument will be carried upward, and the hernia will escape from underneath the block. In the above description of block the difficulties just named are effectually obviated by the addition of the rim or flange, which, when applied, rests on and overlaps the superior and anterior edge of the Poupart's ligament, the latter resting in the sulcus or triangular space formed by the rim and body of the block. In this situation it is secured by the perineal strap so firmly as to effectually prevent any protrusion.

Drawing No. 14, Fig. 3, is a neck and head, differing not very materially from the one before described, except that the neck is bent inward, forming an obtuse angle, Fig. 3, by which the head of the spring is set a little more than its own thickness within a line parallel to the inside of the spring-cover. The particular advantages derived from the bend or angle in the neck, as above described, are that the instrument is rendered less complicated by dispensing with the brass plate to advantage, much less force being required to secure the head of the spring to a plane of wood or other yielding substance than to one of polished metal. The block can be moved back as far as necessary without coming in contact with the spring or its covering, moving within a parallel line of the inside of the spring-cover.

The knob-headed screw, Fig. 2, is precisely like the one before described, except the screw part, which is longer than the former, resembling a common "wood-screw," as it is called, with a deep coarse thread, to secure its hold more firmly in the wood. The same kind of spring is used with this as with the other form of neck and head before described.

The semi-elastic block shown in Drawing No. 17, Fig. 1, is constructed of wood and various elastic fabrics in the following manner, viz: The wood corresponds to the general contour of the block or pad, except its being flat on the posterior surface. It constitutes about one-half of its whole bulk, forming the anterior face or plane of the block. The posterior surface of the block to the edge of the plane is covered with firm twilled cotton fabric, made fast to the block with glue, upon which are placed several layers of very fine thick elastic woolen fabric, each successive layer being cut smaller than the one next preceding it, by which the convexity or prominence of the block is formed, the whole of which is covered with a piece of the same, terminating with the edge of the first partial covering above described. With the aid of compression the elasticity of that portion of the block or pad is regulated to meet the indication. Over this is firmly drawn a second covering of twilled cotton a little larger than the former, and secured by a draw-string or otherwise. The outer and last covering is of silk, enveloping the whole, except a small elongated space on the anterior face or plane of the block. The above is applicable to the various sizes and forms of blocks or pads.

The semi-elastic block is peculiarly adapted to various abnormal conditions of the inguinal region. For instance, if from previous ulceration, which is not uncommon in that part, a cicatrice of large or small size remains, the semi-elastic block will meet the various indications more successfully than any other form, and particularly if the hernia protrudes with so much force as to require the application of a very strong spring. The integument, having lost its natural elasticity and pliancy, is sure to ulcerate under the pressure of a non-elastic substance, which is entirely obviated by the use of the semi-elastic block. Ventral or direct hernia, passing out very close to the pubic bone and protruding with great force, is more effectually and securely retained with this than the hard block, in consequence of the unyielding parts—viz., the pubic bone and Poupart's ligament—being accommodated by the yielding or pliant surface of the semi-elastic block; also, when the patient is of a nervous temperament, easily excited and excoriated, great inconvenience will result to him from the application of an unyielding substance, while the semi-elastic block will be worn with comfort, if well constructed, answering the indications in the treatment for retention or radical cure of hernia.

The umbilical truss shown in Drawing No. 12 is constructed with a steel spring similar to other umbilical springs. Attached to the anterior end of the spring is a double neck and head, Fig. 1, about two and one-fourth inches in length, including the lap on the spring, one of which is fixed stationary to the inside of the spring by a rivet and knob-headed screw, Fig. 2, the rivet being anterior to the screw on which the other neck turns on the outer side of the spring. The object of the knob-screw being placed in the usual situation of the rivet will be readily seen, it being to diminish mobility at the situation of the curved screw, Fig. 3, and to bring the separation of the inner edges of the two blocks nearer upon a parallel line. Each neck and head is of a peculiar shape, as shown in the drawings, with a projection on each neck about three-eighths of an inch from the anterior end of the spring, through which a curved screw passes, Fig. 4, and being riveted into the stationary neck. The mobility of the other head is governed by a thumb burr or nut on the outside of the neck, Fig. 5. From the above-described projections the heads diverge in curved lines and are flattened, with a screw-hole about the center of each head, Fig. 6, through which screws pass, fixing the blocks to the heads of the spring. Each block, Fig. 7, presents the form of a crescent on its outer plane surface and is convex on its inner surface, with a slight depression or excavation on the inner edge of the most prominent part. The two surfaces designed to grasp the neck of the sack, and which are made to approximate each other, or vice versa, by means of the curved screw, are slightly concave and have their edges rounded off, adapted to the contour of the part to which they are to be applied. The periphery or semi-lunar edge terminate in a narrow rim or flange, Fig. 8. The spring-cover does not differ materially from others in use, except that it has at the "posterior end," as it is called, instead of a strap of leather with button-holes, a small buckle attached, Fig. 9. On the plane of each block, between it and each head of the spring, is secured the end of a small narrow strap, Fig. 10, about four inches in length, and fastening into the buckle on the end of the spring-cover before described, Fig. 11, secures the instreument in its place.

The above-described instrument is the size required for a child about three years of age.

The spring guard or check, Drawing No. 13, is made of iron or other suitable metal, consisting of two square bars, Fig. 10, running parallel to within about two inches of the anterior end, where they are bent downward as an obtuse angle, Fig. 11, slightly converge, and are joined together by a cross-bar about an inch in length with a small screw-hole in the center, Fig. 12, the posterior ends being joined in the same way at a distance of about one and a half inch. It is semicircular, corresponding to the shape of the spring to which it is applied, (see Drawings No. 18 and 19,) with the anterior end resting on the plane of the block, each side bar passing backward above and below the edges of the spring to about the center of the back, where the cross-bar or posterior end rests on the outer side of the spring, and is secured in its place by a short strap attached to the outside of the spring-cover, passing under the cross-bar, turns back upon itself, and is made fast by means of a small buckle.

The object of the above-described instrument is to confine the action of the spring to certain limits to prevent its being forced out by any sudden propulsion of the abdominal viscera, which may give exit to the hernia. By fixing the anterior end to the plane of the block with a screw passed through the screw-hole before described, undue pressure from the use of a very strong spring while in a recumbent position may also be obviated.

What I claim is—

1. Constructing the ventro-inguinal block (Nos. 1 and 4 of the accompanying drawings) with a depression on the inner and lower edge and surface of it, so as to admit of the descent of the spermatic vessels without pressure when on the iliac side of the ring.

2. Constructing the block for ventral or direct hernia (No. 15 in drawings) with a sulcus or depression on its lower and inner edge, so formed that it will rest on Poupart's ligament and prevent the block from sinking too deeply and its being drawn downward by the perineal strap, as set forth.

3. The combination of the check or guard (No 13 in drawings) with the truss-spring, as set forth.

4. The manner in which I have constructed the block for umbilical hernia (see Drawing No. 12) by forming it in two pieces and connecting each of the pieces with the spring of the truss by a curved piece of iron, and a regulating-screw passing through those pieces for the purpose of separating or approximating the parts of the divided block so as to produce a greater or less degree of pressure on the hernial sack or tumor, all as herein set forth.

5. The method of treating umbilical hernia by means of a truss, (see Drawing No. 12,) constructed and operating, substantially in the manner herein set forth.

W. B. DODSON.

Witnesses:
HENRY STONE,
W. P. N. FITZGERALD.